(12) United States Patent
Watanabe et al.

(10) Patent No.: US 8,175,443 B2
(45) Date of Patent: May 8, 2012

(54) DATA RECORDING AND REPRODUCING APPARATUS

(75) Inventors: Akinobu Watanabe, Yokohama (JP);
Hiroyasu Otsubo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1380 days.

(21) Appl. No.: 11/727,683

(22) Filed: Mar. 28, 2007

(65) Prior Publication Data

US 2008/0019668 A1    Jan. 24, 2008

(30) Foreign Application Priority Data

Jul. 18, 2006    (JP) ................................ 2006-195342

(51) Int. Cl.
*H04N 5/928* (2006.01)
*H04N 5/92* (2006.01)

(52) U.S. Cl. ........................ 386/338; 386/326

(58) Field of Classification Search .................. 386/263, 386/264, 326, 328, 329, 332, 337, 338, 355, 386/357

See application file for complete search history.

(56) References Cited

U.S. PATENT DOCUMENTS

| 7,555,501 B2 * | 6/2009 | Kohno | 707/999.202 |
| 2007/0025702 A1 * | 2/2007 | Khan et al. | 386/96 |
| 2008/0019666 A1 * | 1/2008 | Kato et al. | 386/96 |

FOREIGN PATENT DOCUMENTS

JP    2001-110125 A    4/2001

\* cited by examiner

*Primary Examiner* — Robert Chevalier
(74) *Attorney, Agent, or Firm* — McDermott Will & Emery LLP

(57) ABSTRACT

The data recording and reproducing apparatus comprises a transcoding module and a recording and reproducing module. The transcoding module transcodes a video or audio signal based on one compression method to a signal based on another compression method, the video or audio signal being inputted through a tuner. The recording and reproducing module records, to a recording medium, the transcoded video or audio signal together with the inputted video or audio signal, the transcoded video or audio signal having been transcoded by the transcoding module. The recording and reproducing module records one of the video or audio signals, which are identical but based on different compression methods, with the other video or audio signal being written to the recording medium as a hidden file.

4 Claims, 11 Drawing Sheets

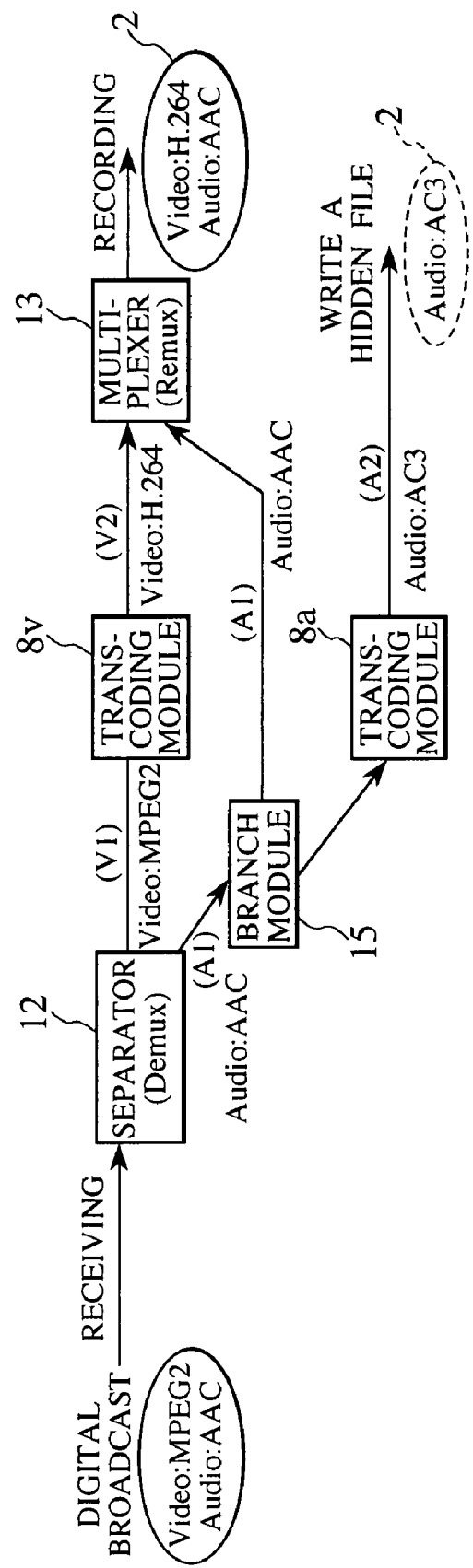

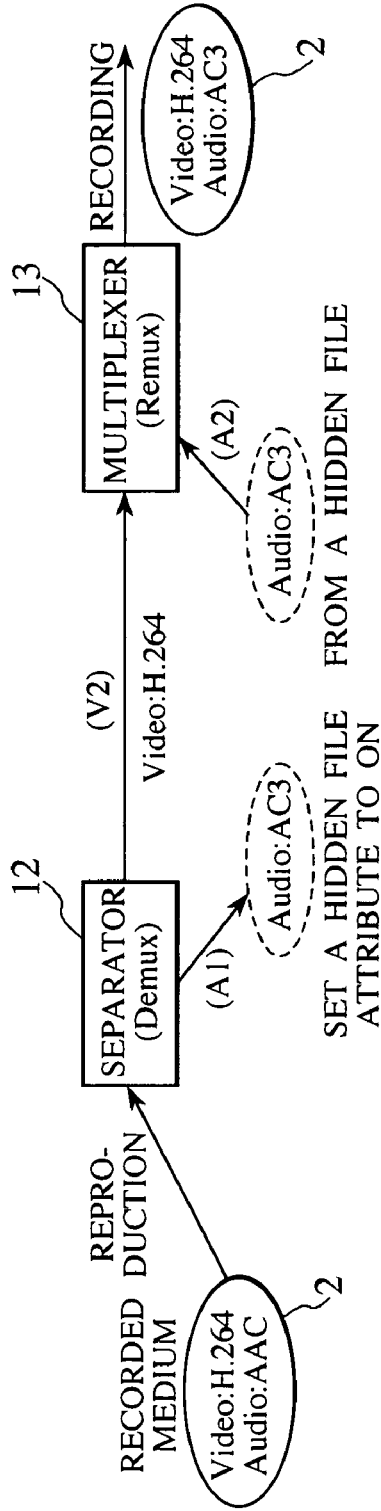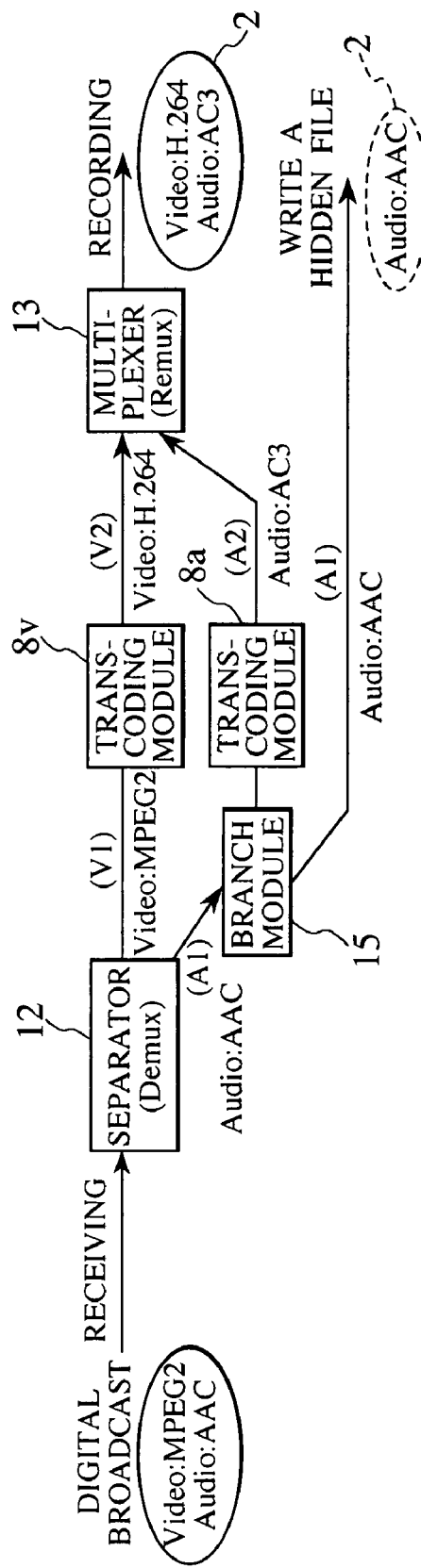

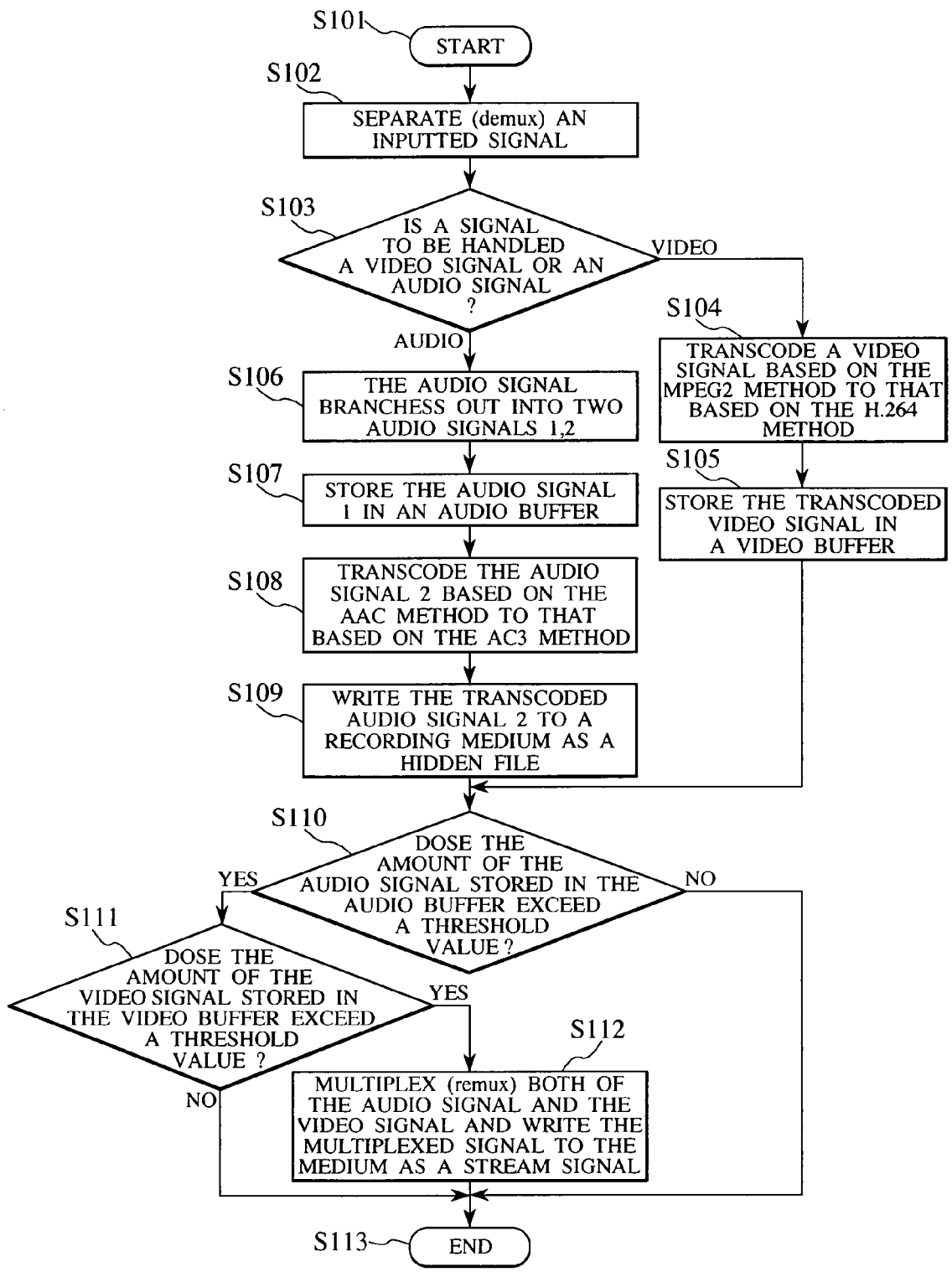

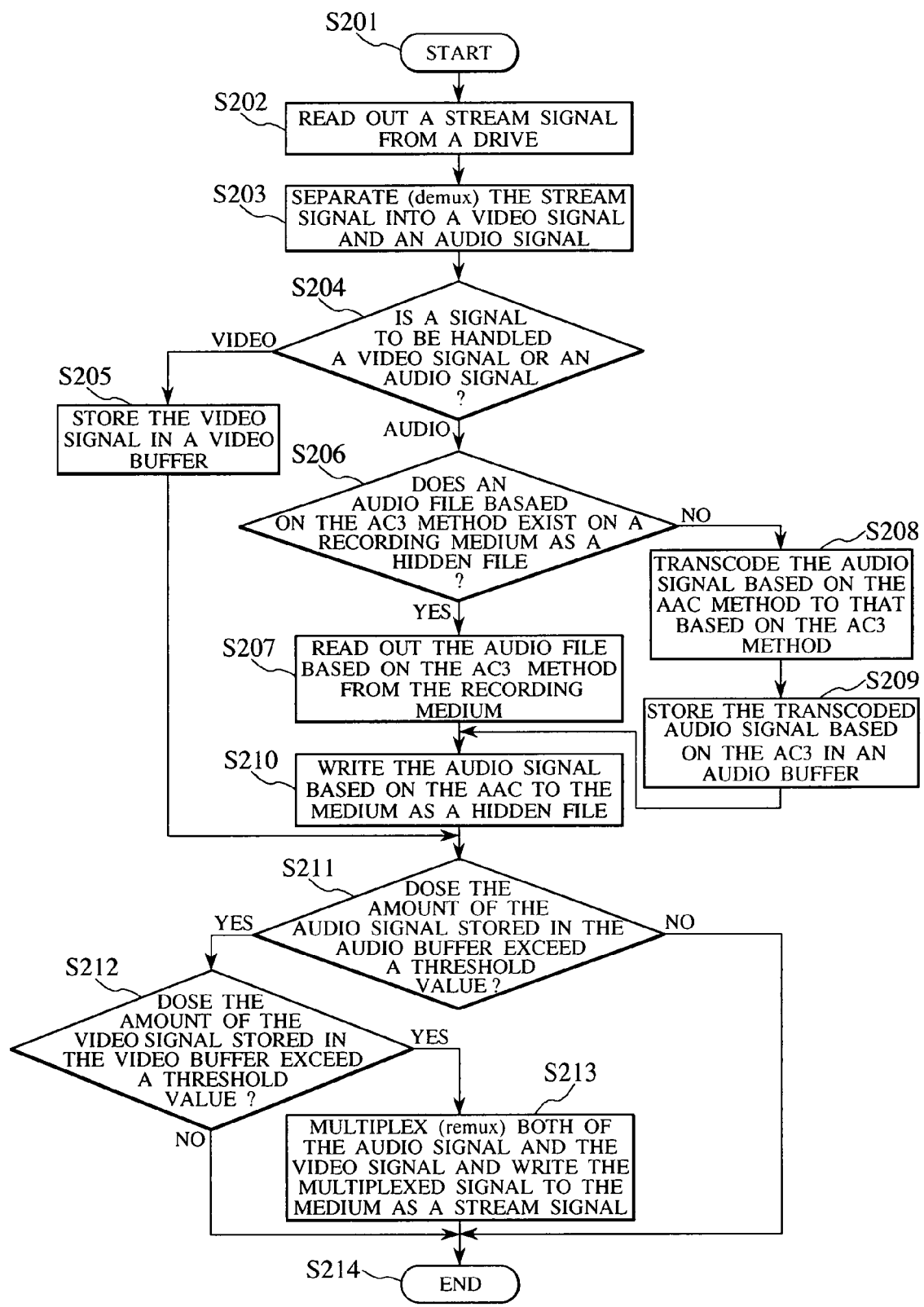

FIG.10A  V1:MPEG2  A1:AAC
V2:H.264  A2:AC3
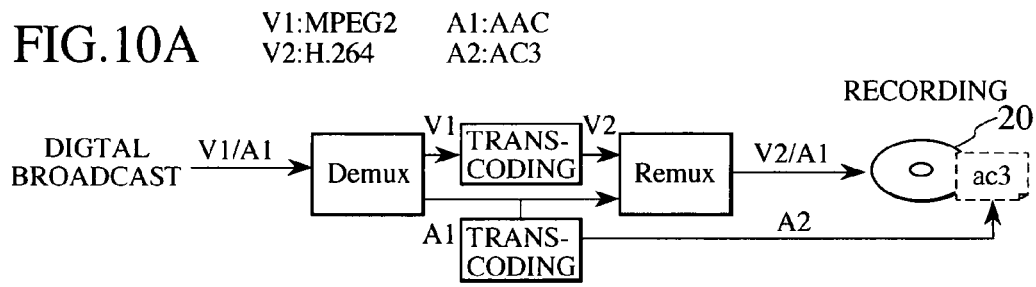
FIG.10B
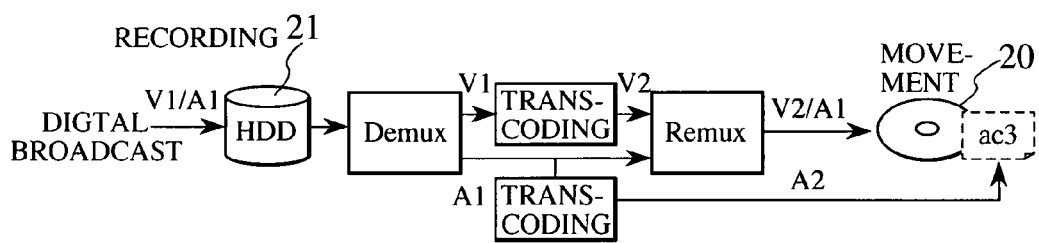
FIG.10C
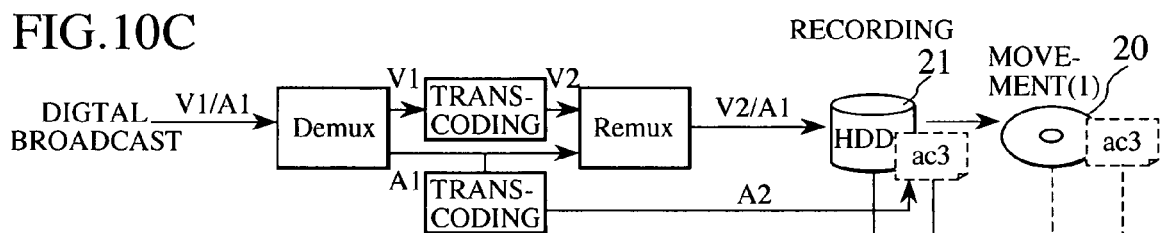
FIG.10D
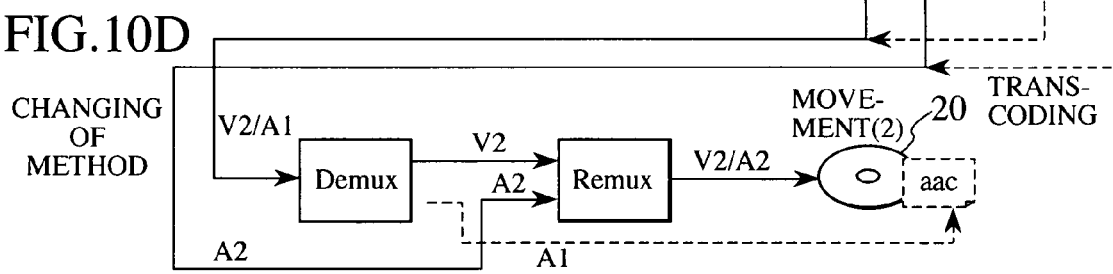

DATA RECORDING AND REPRODUCING APPARATUS

CLAIM OF PRIORITY

The present application-claims priority from Japanese Application serial no. JP2006-195342, files on Jul. 18, 2006, the content of which is hereby incorporated by reference into this application.

BACKGROUND OF THE INVENTION (1) Field of the Invention

The present invention relates to a data recording and reproducing apparatus which encodes image and audio signals to record and reproduce these signals to and from a recording medium.

(2) Description of the Related Art

As a large-capacity optical-disc recording medium in which video and audio signals of a digital broadcast are recorded, BD (Blu-ray Disc) and HD (High-Definition) DVD are expected to be widely used. BD and HD DVD media are used for recording and reproduction with a laser beam having a shorter wavelength (405 nm) than that of DVD.

The standards for recording video and audio signals in a BD medium have already been established. As an application format used for rewritable media, standards which are called a BDAV (BD Audio/Visual) format have been established. This BDAV format adopts a stream format that complies with the digital broadcast standards. In addition, the BDAV format has good edit functions. The BDAV format, therefore, is characterized by specifications that are suitable for recording of broadcasted programs. According to the BDAV format, a received digital broadcast based on a certain compression method (encoding method) is recorded to a BD medium just as it is without changing the compression method. To be more specific, a video signal is received by the MPEG2 method; and an audio signal is received by the AAC (Advanced Audio Coding) method. Then, the video and audio signals are recorded to the BD medium just as they are.

On the other hand, as an application format that uses a BD medium, and that is used for read-only media, standards which are called the BDMV (BD MoVie) format have been established. Using this BDMV format, it is possible to realize a full interactive menu, and the like. Moreover, the BDMV format supports, for example, a picture-in-picture function, and a high compression stream such as the H.264 standards. Therefore, in comparison with the conventional DVD-Video, the BDMV format has specifications with high functionality. To be more specific, according to the BDMV method, a video signal is compressed by the H.264 method, whereas an audio signal is compressed by the AC3 (Audio Code number 3) method, before the video and audio signals are recorded.

Therefore, if a plurality of compression encoding methods are adopted for the same BD medium, it is necessary to change between these compression methods. When a compression method is changed (transcoded), it is required to change the compression method at higher speed and efficiently. For example, Japanese Patent Application Laid-Open No. 2001-110125 proposes the technology for changing a compression method without increasing product costs, and with material data (video/audio data) being transferred at a speed high than the normal speed. Here, compressed material data which is inputted at a transfer rate exceeding the normal speed is recorded in a medium just as it is. After that, using the unused time during which no access is made to the medium, the compressed material data is read out from the medium to transcode the material data in question, at the normal speed, to data based on a different compression method, and then the transcoded data is recorded in the medium again.

SUMMARY OF THE INVENTION

However, compression methods are not limited to the above-described compression methods. In future, it is expected that new methods will be adopted, and that combinations of compression methods for compressing video and audio signals will diversify. As a result, because compression methods required by users will also diversify, signals (data) based on the diversifying compression methods must be quickly supplied. In such a case, because the transcoding technology described in the Japanese Patent Application Laid-Open No. 2001-110125 is based on the premise that transcoding and rerecording are performed using the unused time during which no access is made, the processing time is separately required for this purpose. If the timing of transcoding processing is delayed, there arises a case where data based on a method desired by a user cannot be quickly supplied. Furthermore, because changing of compression methods is troublesome work for users, it is desirable that the compression methods be automatically changed without causing each user to be particularly conscious of the change.

An object of the present invention is to provide a data recording and reproducing apparatus that is capable of immediately supplying each user with data whose compression method is desired by the user.

According to one aspect of the present invention, there is provided a data recording and reproducing apparatus comprising: a transcoding module which transcodes an inputted video or audio signal based on one compression method to a signal based on another compression method; and a recording and reproducing module which records, in a recording medium, the transcoded video or audio signal together with the inputted video or audio signal, the transcoded video or audio signal having been transcoded by the transcoding module. The recording and reproducing module records one of the video or audio signals, which are identical but based on different compression methods, with the other video or audio signal being written to the recording medium as a hidden file.

In addition, the data recording and reproducing apparatus according to the present invention further comprises: a tuner which receives a digital broadcast signal into which a video signal compressed by a first video compression method and an audio signal compressed by a first audio compression method are multiplexed; a multiplexing module which multiplexes a video signal and an audio signal to generate a video and audio stream signal; and a separating module which separates the video and audio stream signal into a video signal and an audio signal. The separating module separates the digital broadcast signal received by the tuner into a video signal and an audio signal. The transcoding module transcodes the video and audio signals acquired as a result of the separation to a video signal based on a second video compression method and an audio signal based on a second audio compression method respectively. The multiplexing module multiplexes either the audio signal based on the first audio compression method or the audio signal based on the second audio compression method with the video signal based on the second video compression method to generate a video and audio stream signal. The recording and reproducing module writes, to the recording medium, the video and audio stream signal generated by the multiplexing module, and also writes the other audio signal, which has not been multiplexed by the multiplexing module, to the medium as a hidden file.

Moreover, in the data recording and reproducing apparatus according to the present invention, the recording and reproducing module reproduces the video and audio stream signal recorded to the recording medium, and also reads out, from the recording medium, the audio signal that is the hidden file. The separating module separates the video and audio stream signal into a video signal and an audio signal. The multiplexing module multiplexes the video signal acquired as a result of the separation and the audio signal that has been read out as the hidden file, and thereby generates a new video and audio stream signal. The recording and reproducing module records the newly generated video and audio stream signal to the recording medium, and also writes the audio signal acquired as a result of the separation to the recording medium as a hidden file.

BRIEF DESCRIPTION OF THE INVENTION

These and other features, objects and advantages of the present invention will become more apparent from the following description when taken in conjunction with the accompanying drawings wherein:

FIG. 2 is a diagram illustrating, as an example, processing of transcoding video and audio signals based on the H.264 method and the AAC method, respectively, according to the embodiment;

FIG. 3 is a diagram illustrating, as an example, processing of transcoding video and audio signals based on the H.264 method and the AC3 method, respectively, according to the embodiment;

FIG. 4 is a diagram illustrating, as an example, processing of transcoding video and audio signals based on the H.264 method and the AC3 method, respectively, according to the embodiment;

FIG. 5 is a flowchart illustrating the flow of signal processing shown in FIG. 2;

FIG. 6 is a flowchart illustrating the flow of signal processing shown in FIG. 3;

FIGS. 10A through 10D are diagrams illustrating various modes in which a digital broadcast signal is recorded using a plurality of media;

DETAILED DESCRIPTION OF THE PREFERRED EMBODIMENTS

Preferred embodiments of the present invention will be described with reference to drawings as below. These embodiments will be described with each of MPEG2 and H.264 being taken as an example of a video signal compression method, and with each of AAC and AC3 being taken as an example of an audio signal compression method. However, the present invention does not limit the compression methods to them.

Figure 1:
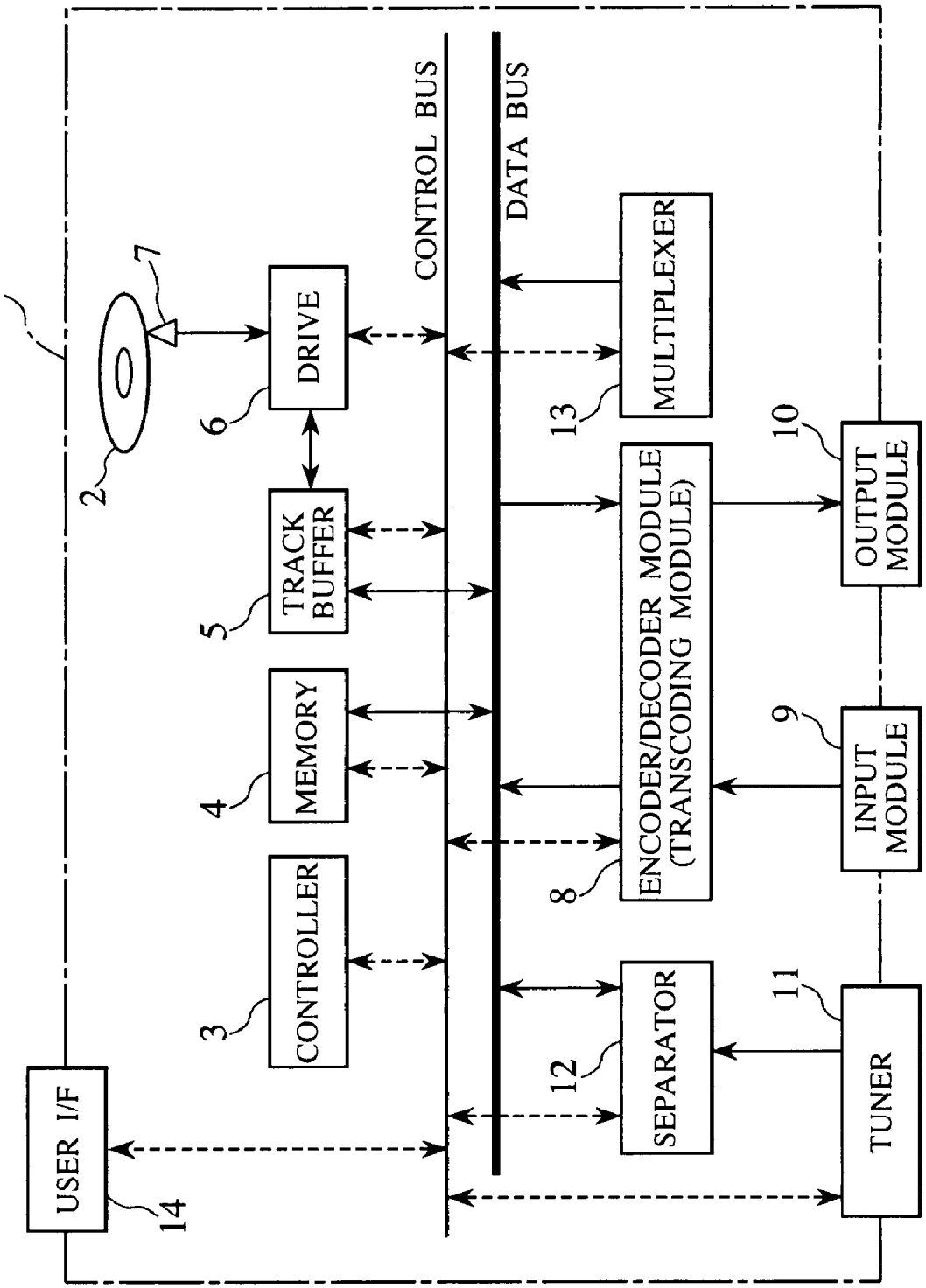
FIG. 1 is a block diagram illustrating one embodiment of a data recording and reproducing apparatus according to the present invention.

FIG. 1 is a block diagram illustrating one embodiment of a data recording and reproducing apparatus according to the present invention; A data recording and reproducing apparatus 1 records video and audio signals acquired as a result of receiving a digital broadcast, or video and audio signals inputted from an external device such as a camera, to a recording medium 2 such as an optical disc by use of a specified compression encoding method. In addition, the data recording and reproducing apparatus 1 reproduces video and audio signals from the recording medium 2, and then outputs the signals as signals based on the specified compression method.

The recording medium 2 is a rewritable optical disc such as a BD. Video and audio signals are written to the recording medium 2 with high quality in the BDAV format, or in the BDMV format, or in a format into which these formats are combined. A controller 3 controls the data recording and reproducing apparatus 1 as a whole. More specifically, the controller controls settings of an encoder/decoder module 8, and also controls reading/writing (R/W) of data from/to a drive 6. A memory 4 is a working memory, such as a SDRAM, which is used as a work area of the controller 3. A track buffer 5 is a buffer memory used to read/write data from/to the drive 6, and is constituted of a large capacity memory such as a SDRAM. The drive 6 drives the medium 2 to perform reading and writing of data. A pickup 7 is built into the drive 6, and irradiates the disk medium 2 with a laser beam so as to perform R/W of a signal.

The encoder/decoder (transcoding) module 8 compresses and encodes video and audio signals inputted from the outside, and also decompresses and decodes a signal read out from the medium 2. Moreover, the encoder/decoder (transcoding) module 8 has a function of transcoding video and audio signals received from a digital broadcast, and data read out from the medium 2, to signals based on a different compression method. An input module 9 inputs analog video and audio signals received from the outside of the apparatus 1. An output module 10 outputs analog video and audio signals to the outside of the apparatus 1. A tuner 11 receives a digital broadcast, and inputs a video-audio multiplexed signal (hereinafter referred to as a "stream signal") into the apparatus 1. A separator 12 separates a stream signal received from the tuner 11, or a stream signal read out from the medium 2, into a video signal and an audio signal. A multiplexer 13 multiplexes a video signal and an audio signal to generate a stream signal. A user interface (I/F) 14 includes operation buttons which a user operates, a FL display tube, and a remote-control light receiving module. The user IF 14 receives an instruction from a user, and displays notification information for the user.

First of all, transcoding processing of transcoding video and audio signals based on a compression encoding method in an apparatus according to this embodiment will be outlined (hereinafter the compression encoding method is also merely referred to as a "method").

The data recording and reproducing apparatus according to this embodiment separates a stream signal received by a tuner into a video signal (V1) and an audio signal (A1), and then transcodes the video signal (V1) and the audio signal (A1) to a video signal (V2) and an audio signal (A2) respectively, each of which is based on a specified method. After that, the transcoded video signal (V2) and the audio signal (A1) acquired as a result of the separation are multiplexed. The multiplexed signal is then recorded to the medium 2 as a stream signal (V2/A1). In addition to it, the transcoded audio signal (A2) is also recorded to the medium 2 as a hidden file.

When a method of the stream signal (V2/A1) which is recorded to the medium 2 is changed, the above-described signals are read out from the medium 2, and then the stream signal (V2/A1) is separated into the video signal (V2) and the audio signal (A1). The video signal (V2) is then multiplexed with the audio signal (A2), which is the hidden file, so as to generate a different stream signal (V2/A2) that is based on a different method. The stream signal (V2/A2) whose method has been changed is written to the medium 2 together with the audio signal (A1) that is to be written as a new hidden file.

In another case, the data recording and reproducing apparatus separates the stream signal received by the tuner into the video signal (V1) and the audio signal (A1), and then transcodes the video signal (V1) and the audio signal (A1) to the video signal (V2) and the audio signal (A2) respectively, each of which is based on a specified method. After that, the transcoded video signal (V2) and the transcoded audio signal (A2) are multiplexed. The multiplexed signal is then recorded to the medium 2 as a stream signal (V2/A2). In addition to it, the audio signal (A1) acquired as a result of the separation is also recorded to the medium 2 as a hidden file.

Thus, two different methods are used to record the same received audio signal (content) so that the two audio signals (A1, A2) are generated. Therefore, if it is necessary to change a method on which a stream signal is based, it is possible to immediately make the change by reading out, from the medium, a signal based on a required method, and then by multiplexing with this signal.

In addition, according to this embodiment, one of the two audio signals (A1, A2) to be recorded to the medium is written as a hidden file. To be more specific, attribute information of an audio signal describes that the audio signal is written as a hidden file. Moreover, when the stream signal which has been written to the medium is erased, the corresponding audio signal which has been written as the hidden file thereof is also deleted at the same time. By writing the other audio signal as a hidden file, a user feels as if only one file exists. In other words, it is not necessary for the user to be conscious of the hidden file. In addition, the user cannot make a change to the hidden file.

Next, processing of changing a method of video and audio signals, which is used in the data recording and reproducing apparatus according to this embodiment, will be described as an example with reference to FIGS. 2 through 4.

FIG. 2 is a diagram illustrating a case where a digital broadcast is received, and then a video signal thereof is recorded to a medium by the H.264 method, whereas an audio signal thereof is recorded to the medium by the AAC method. Here, the video signal of the received digital broadcast is compressed and encoded by the MPEG2 method, whereas the audio signal thereof is compressed and encoded by the AAC method. The video and audio signals are separated by the separator 12. Then, a video signal (V1) is transcoded to a signal (V2) based on the H.264 method by a transcoding module 8v. At a branch module 15, the audio signal (A1) branches out into two signals. One signal is kept unchanged (A1), and the other signal is transcoded to a signal based on the AC3 method (A2) by a transcoding module 8a. A multiplexer 13 multiplexes the video signal (V2), whose method has been changed to the H.264 method, and the audio signal (A1) coming from the branch module 15. Then, the multiplexed stream signal (the video signal is based on the H.264 method; and the audio signal is based on the AAC method) is recorded to the medium. At the same time, the audio signal (A2) whose method has been changed to the AC3 method by the transcoding module 8a is also recorded to the medium as a hidden file.

FIG. 3 is a diagram illustrating a case where a video signal of a stream signal, which is written to a medium, is transcoded to a signal based on the H.264 method, whereas an audio signal of the stream signal is transcoded to a signal based on the AC3 method. The stream signal (the video signal is based on the H.264 method; and the audio signal is based on the AAC method) is read out from the medium, and then the stream signal is separated into a video signal (V2) and an audio signal (A1) by the separator 12. The audio signal (A1) is written to the medium as a hidden file again. On the other hand, the audio signal (A2) based on the AC3 method, which is written to the medium as a hidden file, is read out. After that, the multiplexer 13 multiplexes the video signal (V2) and the audio signal (A2), and then the stream signal (the video signal is based on the H.264 method; and the audio signal is based on the AC3 method) is written to the medium. Thus, as a result of handling the stream signal as described above, the audio signal thereof, which is based on the AAC method, is transcoded to that based on the AC3 method. In this case, at the time of transcoding the audio signal, it is possible to use an audio signal based on the AC3 method, which has been created beforehand. Accordingly, it is not necessary to perform the transcoding processing by the transcoding module, which makes it possible to achieve quick transcoding. In addition, the audio signal (A1), which has been acquired as a result of the separation by the separator 12, is written as a hidden file without discarding it. As a result, even if the transcoded audio signal is retranscoded to the audio signal based on the AAC method, immediate retranscoding becomes possible in like manner.

Moreover, the processing shown in FIGS. 2 and 3 can be performed in succession. This makes it possible to transcode a video signal of the received digital broadcast to a video signal based on the H.264 method, and to transcode an audio signal thereof to an audio signal based on the AC3 method, before the transcoded video and audio signals are written to the medium.

FIG. 4 is a diagram illustrating a case where a digital broadcast is received, and then a video signal thereof is directly written to a medium by the H.264 method, whereas an audio signal thereof is directly written to the medium by the AC3 method. A video signal is transcoded to that based on the H.264 method (V2). An audio signal branches out into two signals, and one signal is then transcoded to a signal based on the AC3 method (A2). The processing up to this point is the same as that shown in the FIG. 2. Here, the multiplexer 13 multiplexes the video signal with the audio signal (A2) whose method has been changed to the AC3 method. The multiplexed stream signal is then written to the medium. At the same time, the audio signal (A1) coming from the branch module 15 is written to the medium as a hidden file. For the same reason as above, if such a medium is used, it is possible to easily transcode the audio signal based on the AC3 method to that based on the AAC method.

FIG. 5 is a flowchart illustrating the flow of signal processing shown in FIG. 2 described above. As soon as a digital broadcast is received, recording of the digital broadcast to a medium is started (S101). A stream signal inputted from the tuner 11 is separated into a video signal and an audio signal by the separator 12 (S102). Then, a judgment is made as to whether or not a signal to be handled is a video signal or an audio signal (S103). The transcoding module 8v transcodes the video signal based on the MPEG2 method to that based on the H.264 method (S104), before the transcoded video signal is stored in a video buffer 5v (S105). On the other hand, the audio signal branches out into two audio signals 1, 2 (S106). The audio signal 1 is stored in an audio buffer 5a (S107). The audio signal 2 based on the AAC method is transcoded to that based on the AC3 method by the transcoding module 8a (S108). The transcoded audio signal is provided with a hidden file attribute, and is then written to the medium (S109). Thus, the inputted audio signal (based on the AAC method) and the video signal (based on the H.264 method) are stored in the audio buffer 5a and the video buffer 5v respectively. If the amount of the audio signal stored in the audio buffer 5a exceeds a threshold value (S110), and if the amount of the video signal stored in the video buffer 5v exceeds a threshold value (S111), the multiplexer 13 multiplexes both of the audio signal and the video signal. The multiplexed signal is then written to the medium as a stream signal (S112).

FIG. 6 is a flowchart illustrating the flow of signal processing shown in FIG. 3 described above. When a method of a stream signal written to a medium 1 is changed (S201), a stream signal is read out from the medium 1 through the drive 6 (S202). The read stream signal is separated into a video signal (based on the H.264 method) and an audio signal (based on the AAC method) by the separator 12 (S203), and then a judgment is made as to whether or not a signal to be handled is a video signal or an audio signal (S204). The video signal is stored in the video buffer 5v (S205). For the audio signal, a check is made as to whether or not a corresponding hidden file based on the AC3 method exists on the medium (S206). If the hidden file based on the AC3 method exists, the hidden file is read out from the medium to store it in the audio buffer 5a (S207). If the hidden file based on the AC3 method does not exist, the audio signal based on the AAC method is transcoded to that based on the AC3 method by the transcoding module 8a (S208), before the transcoded audio signal is stored in the audio buffer 5a (S209). In addition, the audio signal (based on the AAC method) acquired as a result of the separation is written to the medium as a hidden file (S210). Thus, the audio signal (based on the AC3 method) and the video signal (based on the H.264 method) are stored in the audio buffer 5a and the video buffer 5v respectively. If the amount of the audio signal stored in the audio buffer 5a exceeds a threshold value (S211), and if the amount of the video signal stored in the video buffer 5v exceeds a threshold value (S212), the multiplexer 13 multiplexes both of the audio signal and the video signal. The multiplexed signal is then written to the medium as a stream signal (S213).

Next, how a file written to a medium is structured in this embodiment will be described.

Figure 7A:
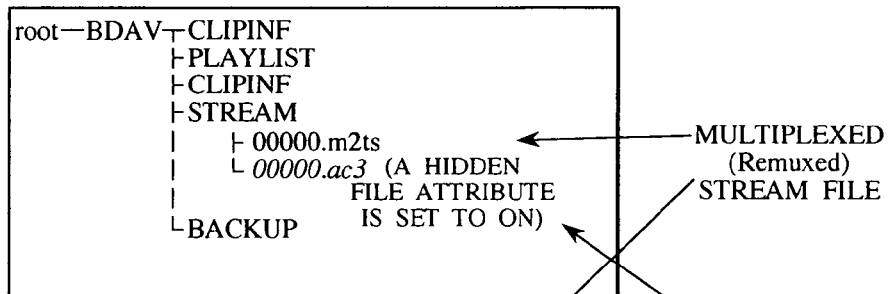
FIGS. 7A through 7D are diagrams each illustrating an example of a file structure (BDAV format) on a BD medium.
Figure 7B:
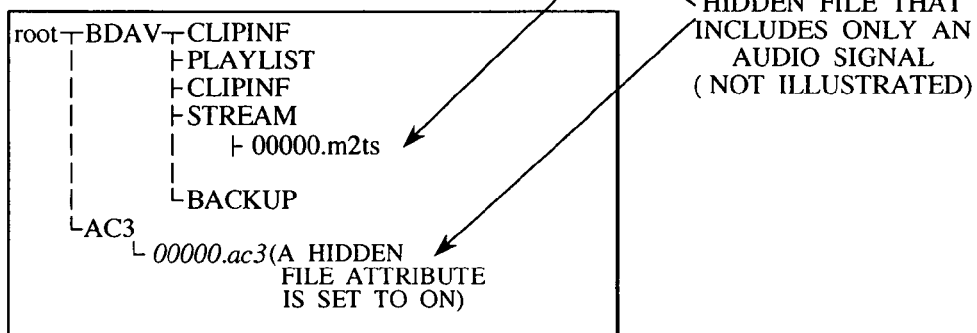
Figure 7C:
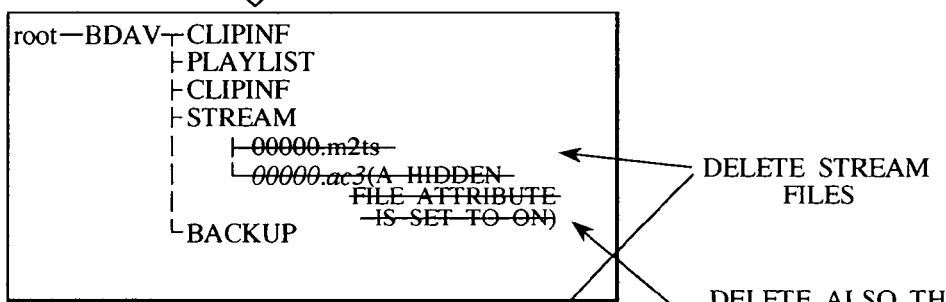
Figure 7D:
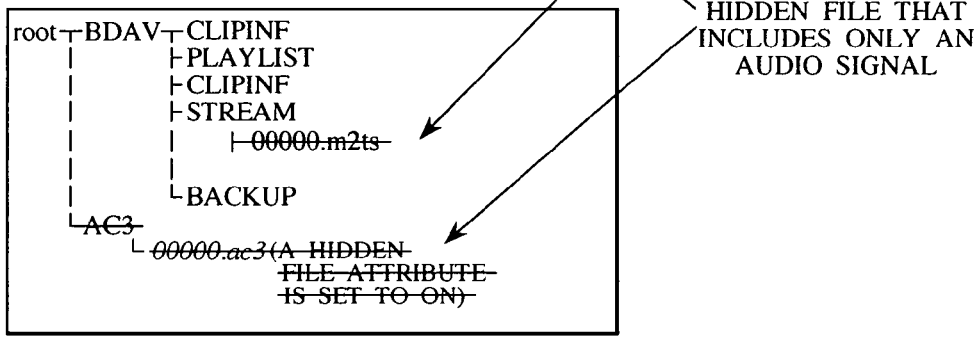

FIGS. 7A through 7D are diagrams each illustrating an example of a file structure (BDAV format) including a hidden file written to a BD medium. FIGS. 7A, 7B illustrate two examples in which a multiplexed stream file, and an audio file (based on the AC3 method) which is a hidden file, are stored. FIGS. 7C, 7D illustrate examples in which these files are deleted.

A root directory "root" of the BDAV format is the top directory of BD, and includes a subdirectory "BDAV". The "BDAV" is a subdirectory immediately under the top directory, and includes subdirectories of "PLAYLIST", "CLIPINF", "STREAM", and the like. "PLAYLIST" is a directory that includes a playlist file. "CLIPINF" is a directory that includes a clip information file. "STREAM" is a directory that includes an AV stream file.

In the example shown in FIG. 7A, a multiplexed stream file "00000.m2ts" according to this embodiment is stored in the subdirectory "STREAM". In addition, the stream file "00000.m2ts" is structured in the MPEG2 transport stream (ISO/IEC13818-1) format. Further, an audio file "00000.ac3" is also stored in the subdirectory "STREAM", and a hidden attribute thereof is set to ON (more specifically, the audio file "00000.ac3" is not displayed on a screen).

In the example shown in FIG. 7B, the stream file "00000.m2ts" is stored in the subdirectory "STREAM". The audio file "00000.ac3" is stored in another folder "AC3" immediately under the root directory "root". Also in this case, the hidden attribute thereof is set to ON (more specifically, the audio file "00000.ac3" is not displayed on the screen). Incidentally, if the folder "AC3" does not exist, the folder "AC3" is newly created before the audio file "00000.ac3" is stored therein.

FIG. 7C illustrates a case where the stream file "00000.m2ts" is deleted from the above structure shown in FIG. 7A. In this case, not only the stream file "00000.m2ts" (indicated with a cancellation line in the figure), but also the audio file "00000.ac3" corresponding to this stream file, are deleted.

FIG. 7D illustrates a case where the stream file "00000.m2ts" is deleted from the above structure shown in FIG. 7B. However, the hidden audio file "00000.ac3" is also deleted in like manner. Incidentally, if the folder "AC3" becomes empty, the folder "AC3" is also deleted.

Thus, when a written stream file which has been acquired from a digital broadcast is erased from the medium, the capacity of the disk medium can be saved by erasing both the stream file and a hidden file corresponding to the stream file. In addition, if the written stream file is subjected to the copyright protection, it is possible to reliably comply with the copyright protection by erasing the stream file together with the hidden file.

In the embodiment described above, the optical disc (BD) is used as a recording medium. However, the recording medium is not limited to this.

Figure 8:
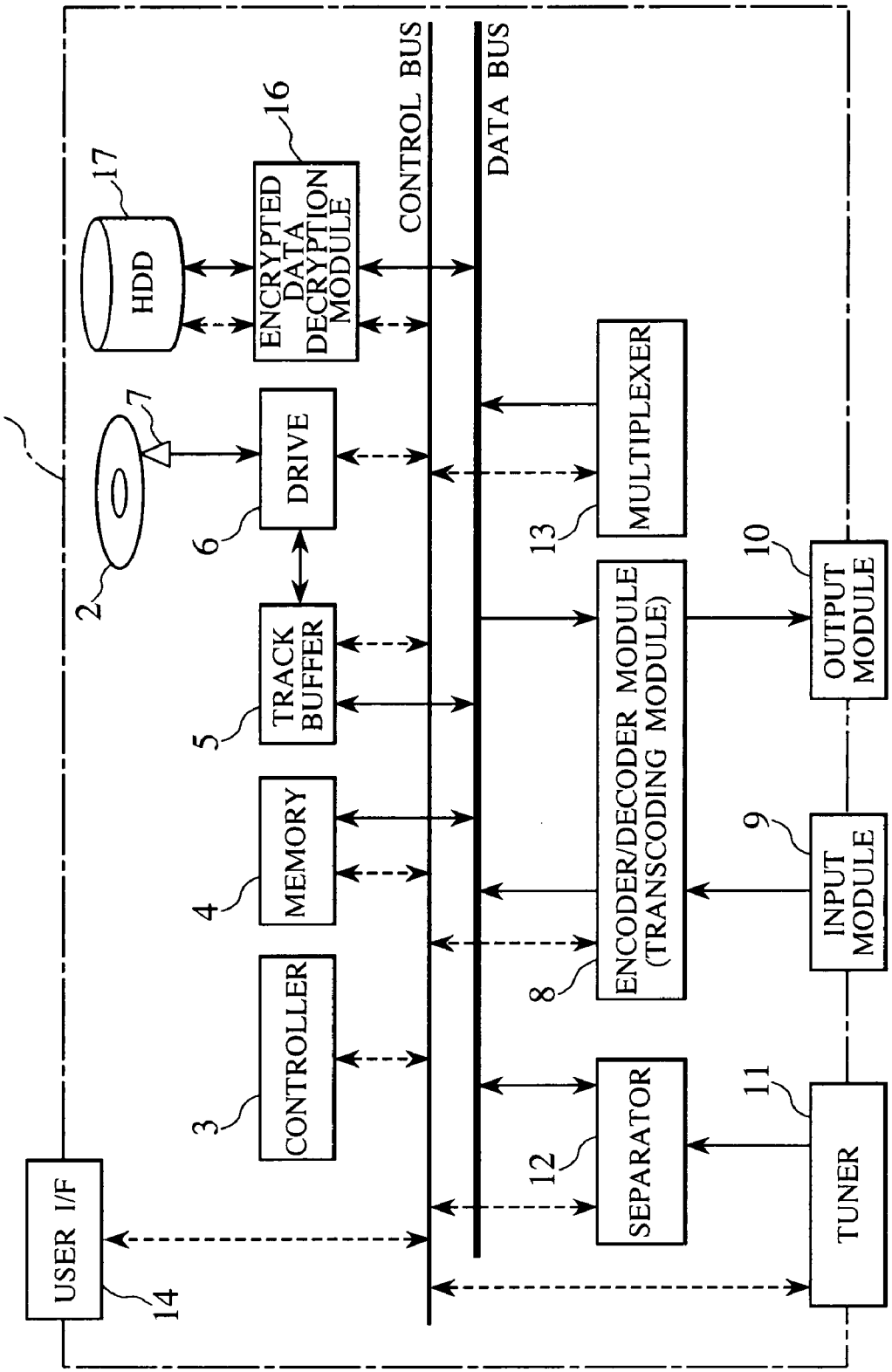
FIG. 8 is a block diagram illustrating another embodiment of a data recording and reproducing apparatus according to the present invention.

For example, as shown in FIG. 8, a data recording and reproducing apparatus in which a hard disk medium (a HDD 17) is also used in combination is capable of recording with a BD medium being used in cooperation with a HDD medium. In this case, as is the case with recording to the BD medium, processing of copyright protection is required even when recording to the HDD medium is performed. Therefore, in this case, the data recording and reproducing apparatus is configured to perform recording and reproduction through an encrypted data decryption module 16.

Figure 9:
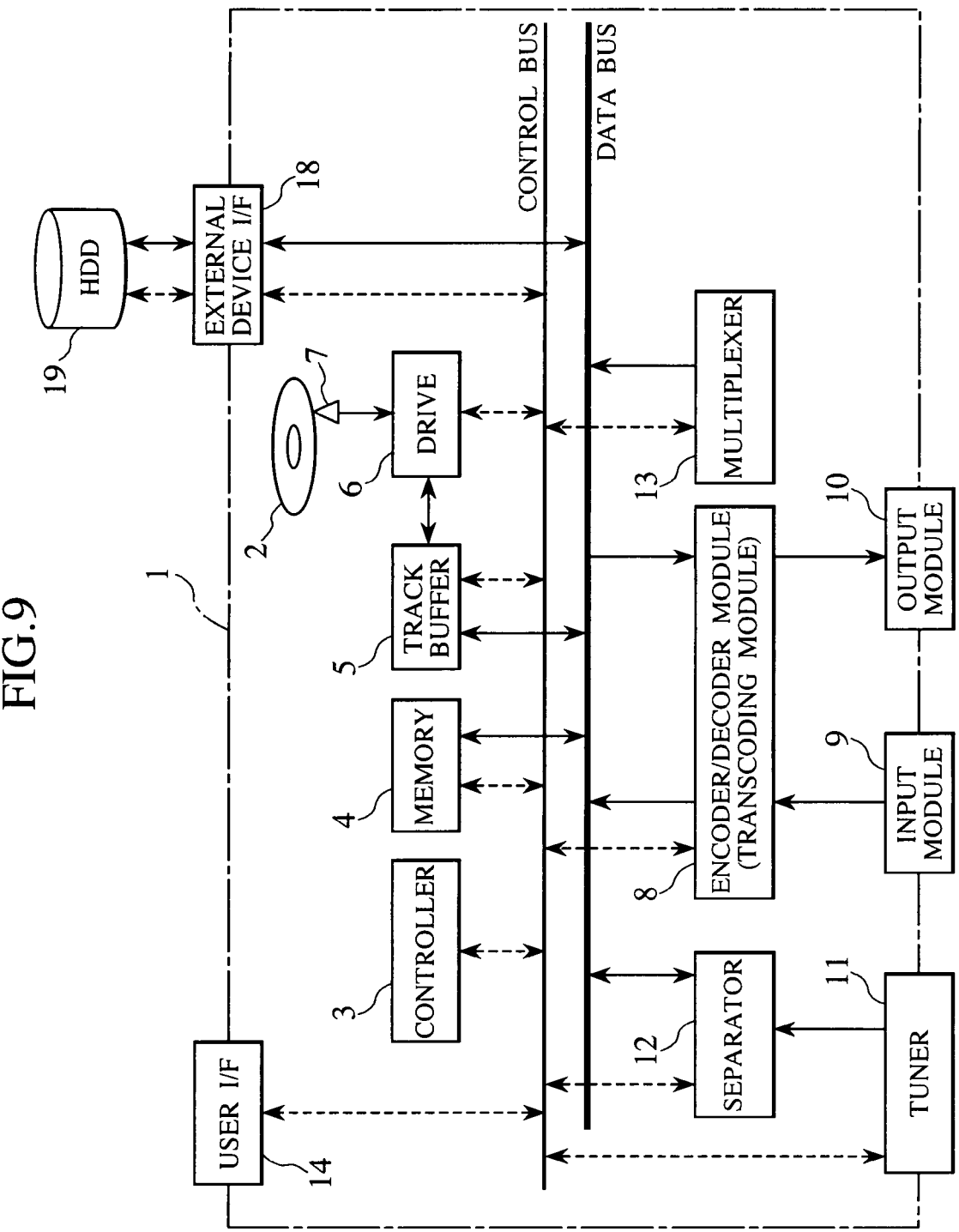
FIG. 9 is a block diagram illustrating still another embodiment of a data recording and reproducing apparatus according to the present invention.

Moreover, as shown in FIG. 9, the data recording and reproducing apparatus includes an external device I/F 18. Accordingly, the data recording and reproducing apparatus is capable of performing recording/reproduction to/from the outside storage device having a function of, for example, USB (Universal Serial Bus) connection. Not only the HDD medium 19, but also a BD medium that is an optical disc storage device, and a SD card and a flash memory, which are semiconductor storage devices, can be used as the outside storage device. Therefore, recording can be carried out in cooperation with these storage devices. Further, even if other HDD recorders, and recording media such as a HDD that is built into a HDD video camera, are identified as outside storage devices, it is possible to handle them in like manner.

FIGS. 10A through 10D are diagrams illustrating various modes in which a digital broadcast signal is recorded using a plurality of media. These modes are based on the assumptions that a video signal (=V1) of the digital broadcast is based on the MPEG2 method, whereas an audio signal (=A1) thereof is based on the AAC method, and that a video signal (=V2) to be written to the BD medium is based on the H.264 method, whereas audio signals (=A1), (=A2) are based on the AAC method and the AC3 method respectively.

FIG. 10A illustrates a case where a stream signal is directly recorded to a BD medium 20 according to the processing shown in FIG. 2. After transcoding processing is performed, a stream signal (V2/A1) is written to the BD medium 20 together with the audio signal A2 that is a hidden file.

FIG. 10B illustrates a case where a stream signal is dubbed (moved) from a HDD 21 to the BD medium 20. In this case, a digital broadcast stream (V1/A1) is temporarily written to the HDD 21 just as it is. After that, the stream is read out from the HDD, and is then transcoded. The transcoded stream signal (V2/A1) is moved to the BD medium 20 together with the audio signal A2 that is a hidden file. In this case, according to regulations concerning free movement of content, the stream signal which has been temporarily written to the HDD 21 is erased. As a result of using the HDD, it is possible to sufficiently handle a digital broadcast that is transmitted at high speed.

FIG. 10C also illustrates a case where a stream signal is dubbed (moved) from the HDD 21 to the BD medium 20. In this case, a digital broadcast stream is transcoded, and then a transcoded stream signal (V2/A1) is written to the HDD medium 21 together with the audio signal A2 that is a hidden file. After that, the stream signal is moved from the HDD 21 to the BD medium 20 (move 1). At the same time, the audio signal A2 which is the hidden file is also written as a hidden file just as it is. Also in this case, according to the regulations concerning free movement of content, the stream signal which has been temporarily written to the HDD 21 is erased together with the hidden file.

FIG. 10D illustrates a case where the stream signal (V2/A1) which has been written to the BD medium 20 in FIG. 10C is transcoded to a stream signal (V2/A2). In this case, it is possible to use two kinds of transcoding methods. In FIG. 10C, if the stream signal (V2/A1) still remains in the HDD 21, the stream signal (V2/A1) is read out together with the audio signal A2 that is the hidden file. Then, the audio signals A1, A2 are interchanged to generate the stream signal (V2/A2), which is moved to the BD medium 20 (move 2). In the other case, in FIG. 10C, if the stream signal (V2/A1) has already been moved to the BD medium 20, the stream signal (V2/A1) is read out together with the audio signal A2 that is the hidden file. Then, the audio signals A1, A2 are interchanged in like manner to generate the stream signal (V2/A2), which is written to the BD medium 20.

Thus, by using the HDD 21 in combination, it becomes possible to temporarily store a stream signal that is in the middle of transcoding, and thereby to efficiently generate a signal based on a requested method, and then to write the generated signal to the BD medium.

In the embodiment described above, the two audio signals, each of which corresponds to each of the two kinds of methods, are written to the medium. However, all of audio signals, each of which corresponds to each of three kinds of methods or more, may also be written to the medium after transcoding. If the audio signal is transcoded and handled in this way, it is possible to sufficiently cope with diversifying compression methods. Incidentally, even in this case, audio signals excluding one audio signal (file) based on one method are written as hidden files.

By handling the other audio signals as hidden files as described above, it is possible to facilitate processing to be carried out by users, and it is also possible to effectively comply with the copyright protection. Moreover, if these files are subjected to encryption processing, it is possible to further ensure the copyright protection.

In the above-described embodiment, taking the amount of the video signal into consideration, only one kind of method is used to record the video signal to the medium. However, it is a matter of course that if the capacity of the medium is enough to store a plurality of video signals, each of which corresponds to each of a plurality of methods, it is possible to quickly change a method.

Figure 11:
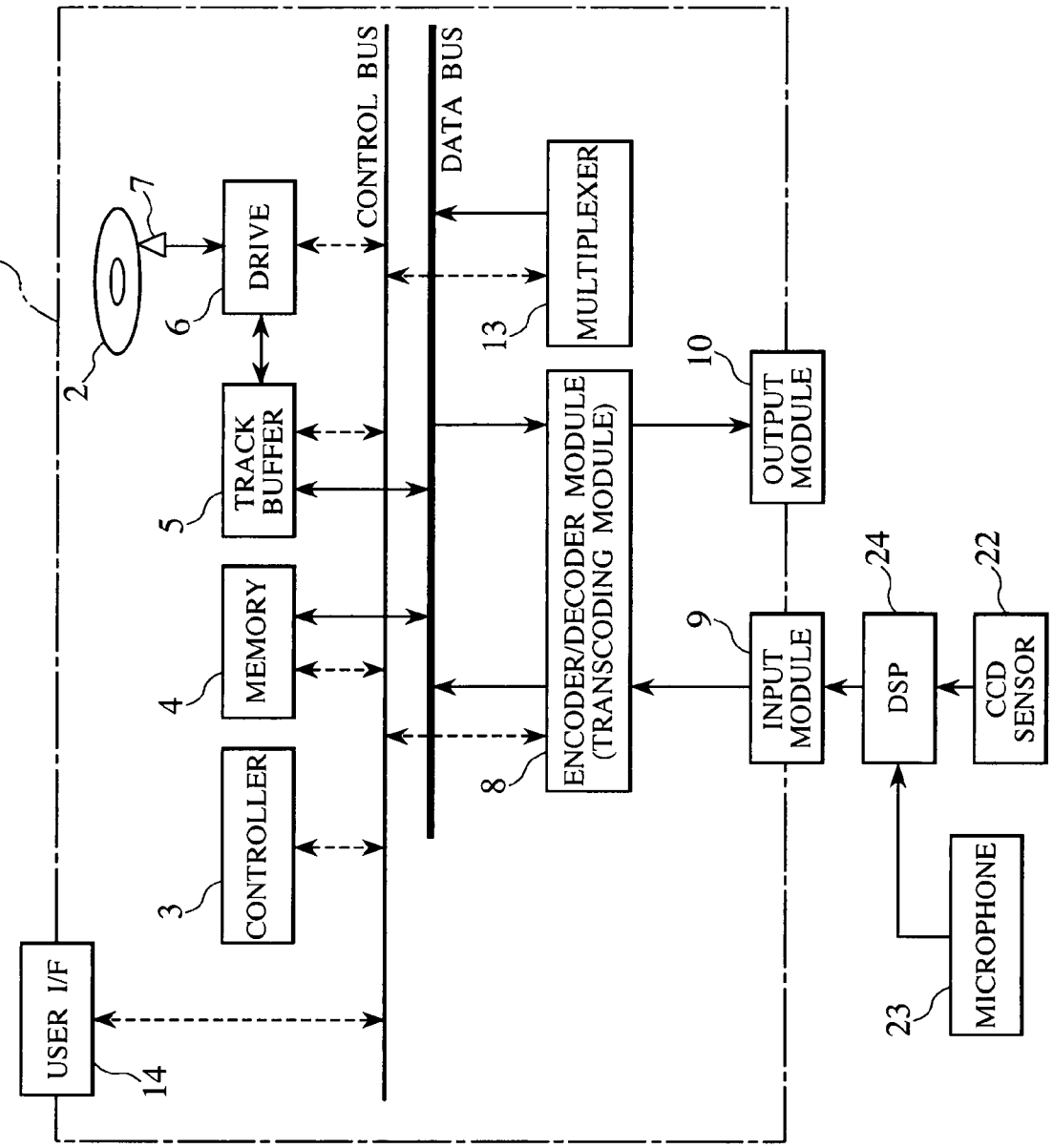
FIG. 11 is a block diagram illustrating a further embodiment of a data recording and reproducing apparatus according to the present invention.

Moreover, the above embodiments described a case where a stream signal is inputted from a digital broadcast. However, the input signal source is not particularly limited. For example, as shown in FIG. 11, even if a video signal received by an CCD (Charge-Coupled Device) sensor 22 of a camera, and an audio signal collected by a microphone 23 of the camera, are inputted through a DSP (Digital Signal Processor) 24 so that the video and audio signals are encoded by a specified compression method before the encoded video and audio signals are written to a medium, the present invention can be applied to this case in like manner.

Figure 12:
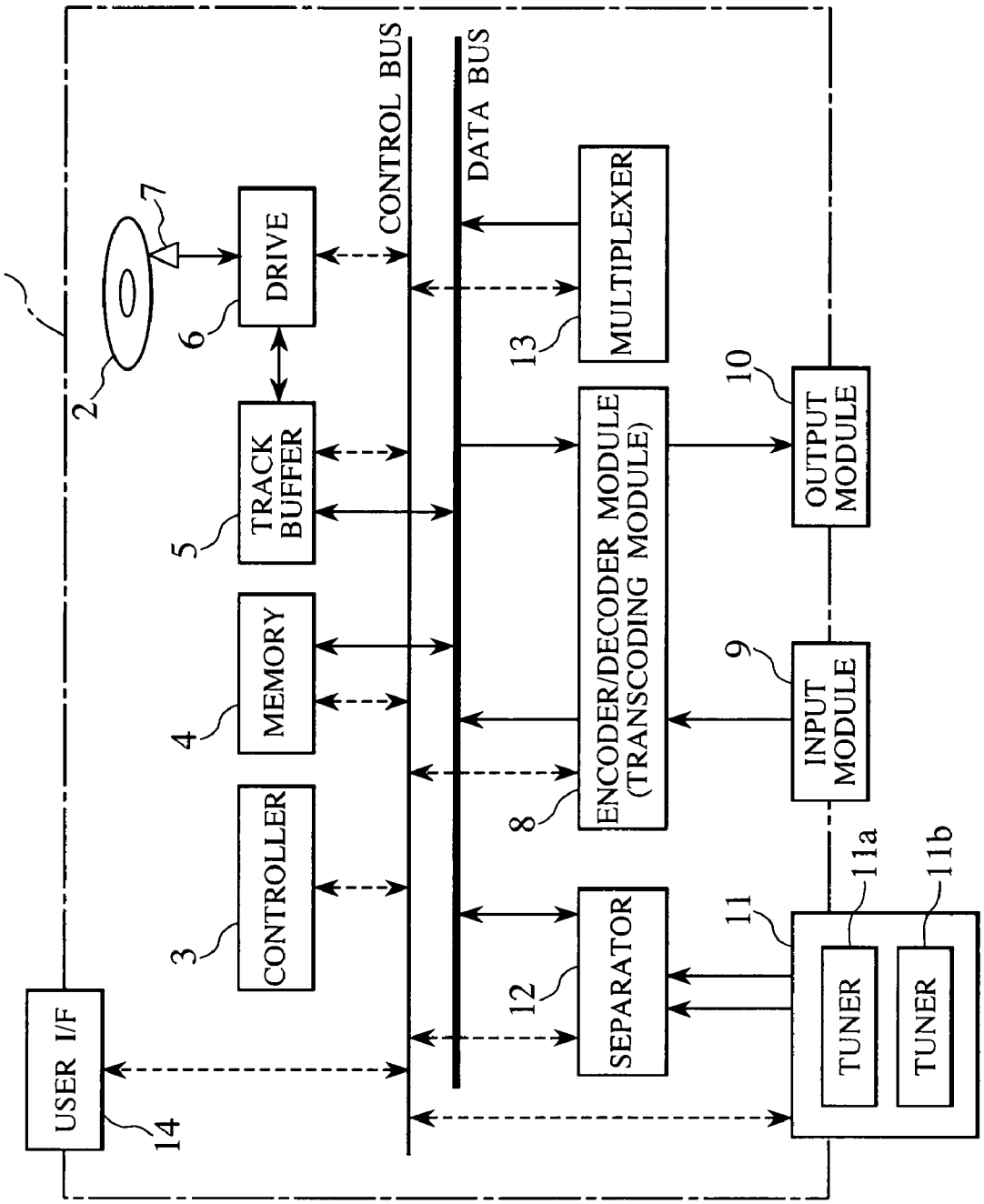
FIG. 12 is a block diagram illustrating still a further embodiment of a data recording and reproducing apparatus according to the present invention.

Furthermore, in the embodiments described above, the data recording and reproducing apparatus is configured to be equipped with only one set of digital tuner. However, the number of input signal sources is not particularly limited. For example, as shown in FIG. 12, even if the data recording and reproducing apparatus is configured to be equipped with two sets of digital tuners 11a, 11b, the present invention can also be applied to this case in like manner by handling, in a time-sharing manner, each digital broadcast that is received by each of the two sets of digital tuners 11a, 11b. Even if the data recording and reproducing apparatus is configured to be equipped with three sets of digital tuners or more, each digital broadcast is handled in like manner.

According to this embodiment, it is possible to record video and audio signals to a medium using a desired method without causing a user to be conscious of a compression method for compressing the video and audio signals to be written to the medium. In addition, in response to user's requirements, it is possible to immediately acquire, from a medium, a transcoded signal whose method has been changed to a desired method.

As described above, according to the present invention, a user can immediately acquire data based on a desired method without being conscious of the change of method.

While we have shown and described several embodiments in accordance with out invention, it should be understood that disclosed embodiments are susceptible to changes and modifications without departing from the scope of the invention. Therefore, we do not intend to bound by the details shown and described herein but intend to cover all such changes and modifications as fall within the ambit of the appended claims.

What is claimed is:

1. A data recording and reproducing apparatus which records a compressed video or audio signal to a recording medium, the data recording and reproducing apparatus comprising:

a transcoding module which transcodes an inputted video or audio signal based on one compression method to a signal based on another compression method;

a recording and reproducing module which records, to the recording medium, the transcoded video or audio signal together with the inputted video or audio signal, the transcoded video or audio signal having been transcoded by the transcoding module;

a tuner which receives a digital broadcast signal into which a video signal compressed by a first video compression method and an audio signal compressed by a first audio compression method are multiplexed;

a multiplexing module which multiplexes a video signal and an audio signal to generate a video and audio stream signal; and a separating module which separates the video and audio stream signal into a video signal and an audio signal, wherein:

the recording and reproducing module records one of the video or audio signals, which are identical but based on different compression methods with the other video or audio signal being written to the recording medium as a hidden file;

the separating module separates the digital broadcast signal received by the tuner into a video signal and an audio signal;

the transcoding module transcodes the video and audio signals acquired as a result of the separation to a video signal based on a second video compression method and an audio signal based on a second audio compression method respectively;

the multiplexing module multiplexes either the audio signal based on the first audio compression method or the audio signal based on the second audio compression method with the video signal based on the second video compression method to generate a video and audio stream signal; and the recording and reproducing module writes, to the recording medium, the video and audio stream signal generated by the multiplexing module, and also writes the other audio signal, which has not been multiplexed by the multiplexing module, to the medium as a hidden file.

2. The data recording and reproducing apparatus according to claim 1, wherein:

the recording and reproducing module reproduces the video and audio stream signal recorded to the recording medium, and also reproduces, from the recording medium, the audio signal that is the hidden file;

the separating module separates the video and audio stream signal into a video signal and an audio signal;

the multiplexing module multiplexes the video signal acquired as a result of the separation and the audio signal that has been read out as the hidden file, and thereby generates a new video and audio stream signal; and the recording and reproducing module records the newly generated video and audio stream signal to the recording medium, and also records the audio signal acquired as a result of the separation in the recording medium as a hidden file.

3. The data recording and reproducing apparatus according to claim 1, wherein:

when the recording and reproducing module deletes a video and audio stream signal recorded in the recording medium, the recording and reproducing module deletes the video and audio stream signal together with a corresponding audio signal that is written to the recording medium as the hidden file.

4. The data recording and reproducing apparatus according to claim 1, wherein:

a first recording medium and a second recording medium can be used as the recording medium;

the recording and reproducing module temporarily writes the digital broadcast signal received by the tuner to the first recording medium;

subsequently, the recording and reproducing module reads out the digital broadcast signal written to the first recording medium so that a new video and audio stream signal is generated by the separator, the transcoding module, and the multiplexer; and the recording and reproducing module writes the generated video and audio stream signal to the second recording medium, and deletes the digital broadcast signal that has been written to the first recording medium.

* * * * *